US012615689B2

(12) United States Patent
Niu et al.

(10) Patent No.: US 12,615,689 B2
(45) Date of Patent: Apr. 28, 2026

(54) METHOD, DEVICE, AND SYSTEM FOR CELL MEASUREMENT IN WIRELESS NETWORKS

(71) Applicant: ZTE Corporation, Shenzhen (CN)

(72) Inventors: Li Niu, Shenzhen (CN); Bo Dai, Shenzhen (CN); Xiubin Sha, Shenzhen (CN); Ting Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 354 days.

(21) Appl. No.: 18/347,872

(22) Filed: Jul. 6, 2023

(65) Prior Publication Data

US 2024/0064858 A1 Feb. 22, 2024

Related U.S. Application Data

(63) Continuation of application No. PCT/CN2021/071913, filed on Jan. 14, 2021.

(51) Int. Cl.
*H04W 76/28* (2018.01)
*H04W 36/32* (2009.01)
*H04W 68/02* (2009.01)

(52) U.S. Cl.
CPC ......... *H04W 76/28* (2018.02); *H04W 36/326* (2023.05); *H04W 68/02* (2013.01)

(58) Field of Classification Search
CPC .... H04W 76/28; H04W 36/326; H04W 68/02
USPC ....................................................... 370/311
See application file for complete search history.

(56) References Cited

U.S. PATENT DOCUMENTS

| | | | | |
|---|---|---|---|---|
| 2009/0181670 A1* | 7/2009 | Tseng | ...................... | H04W 76/28 |
| | | | | 455/434 |
| 2015/0208462 A1* | 7/2015 | Lee | ......................... | H04W 72/23 |
| | | | | 370/311 |
| 2015/0319734 A1* | 11/2015 | Zhang | ................. | H04W 68/005 |
| | | | | 455/458 |
| 2016/0316413 A1* | 10/2016 | Chuang | ................. | H04W 76/28 |
| 2017/0273136 A1* | 9/2017 | Siomina | ............. | H04W 52/0216 |

(Continued)

FOREIGN PATENT DOCUMENTS

| | | |
|---|---|---|
| CN | 110622586 A | 12/2019 |
| CN | 111246503 A | 6/2020 |

(Continued)

OTHER PUBLICATIONS

International Search Report in International Patent Application No. PCT/CN2021/071913 dated Oct. 14, 2021, 4 pages.

(Continued)

*Primary Examiner* — Mark G. Pannell
(74) *Attorney, Agent, or Firm* — Crowell & Moring LLP

(57) ABSTRACT

This disclosure relates generally to cell measurement, cell selection and cell re-selection in wireless communication networks. Performed by a wireless terminal in a wireless network, the method including determining an extended discontinuous reception (eDRX) cycle threshold associated with an access stratum function; determining a reference time window; determining whether the eDRX cycle of the wireless terminal is longer than the eDRX cycle threshold; and in response to the eDRX cycle being longer than the eDRX cycle threshold, configuring or performing Access Stratum (AS) related functions of the wireless terminal.

8 Claims, 4 Drawing Sheets

300

(56) References Cited

U.S. PATENT DOCUMENTS

| | | | |
|---|---|---|---|
| 2018/0176883 A1 | 6/2018 | Fujishiro et al. | |
| 2018/0332549 A1* | 11/2018 | Bhattad | H04W 56/001 |
| 2019/0313475 A1* | 10/2019 | Siomina | H04W 76/28 |
| 2020/0029256 A1 | 1/2020 | Alvarino et al. | |
| 2020/0196242 A1* | 6/2020 | Höglund | H04W 72/23 |
| 2020/0374780 A1* | 11/2020 | Shan | H04W 72/044 |
| 2021/0045026 A1* | 2/2021 | Lee | H04W 76/27 |
| 2022/0104082 A1* | 3/2022 | Sedin | H04W 36/0085 |
| 2022/0124765 A1* | 4/2022 | Li | H04W 52/0216 |
| 2023/0319784 A1* | 10/2023 | Hu | H04W 68/02 |
| 2023/0363048 A1* | 11/2023 | Park | H04W 28/0268 |
| 2023/0422210 A1* | 12/2023 | Li | H04W 52/0229 |
| 2024/0196472 A1* | 6/2024 | Cui | H04W 76/28 |

FOREIGN PATENT DOCUMENTS

| | | |
|---|---|---|
| EP | 3 363 253 B1 | 12/2020 |
| WO | WO 2019/157758 A1 | 8/2019 |
| WO | WO 2019/222050 A1 | 11/2019 |
| WO | WO 2023/069004 A1 | 4/2023 |

OTHER PUBLICATIONS

Huawei et al., "eDRX and RRM measurement relaxation for RedCap UE", *3GPP TSG-RAN WG2 Meeting #112-e, R2-2009935*, Nov. 13, 2020, 7 pages.
Partial European Search Report in European Patent Application No. 21918467.8 dated Jul. 30, 2024, 20 pages.
ZTE Corporation, "Consideration on the control plane of IoT over NTN" 3GPP TSG-RAN WG2 Meeting #113 e-meeting, R2-2100338, Jan. 25, 2021, 7 pages.
English-language Extended European Search Report issued in European Application No. 21918467.8 dated Oct. 21, 2024 (17 pages).

* cited by examiner

METHOD, DEVICE, AND SYSTEM FOR CELL MEASUREMENT IN WIRELESS NETWORKS

CROSS-REFERENCE TO RELATED APPLICATION

This application is a continuation application of PCT International Patent Application No. PCT/CN2021/071913, filed with the China National Intellectual Property Administration, PRC on Jan. 14, 2021, which is herein incorporated by reference in its entirety.

TECHNICAL FIELD

This disclosure is directed generally to wireless communications, and particularly to methods, systems and devices for cell measurement, cell selection, and cell re-selection.

BACKGROUND

A wireless network supports both terrestrial deployments and non-terrestrial deployments. In both deployments, high-quality wireless communications rely on reliable signal coverage. Signal coverage may be cell-dependent. It is critical for a User Equipment (UE) to reduce power consumption while selecting a cell which meets a Quality of Service (QoS) requirement.

SUMMARY

This disclosure is directed to methods, systems and devices for cell measurement, cell selection, and cell re-selection in wireless communication networks.

In some embodiments, a method performed by a wireless terminal in a wireless network is disclosed. The method may include determining an extended discontinuous reception (eDRX) cycle threshold associated with an access stratum function; determining a reference time window; determining whether the eDRX cycle of the wireless terminal is longer than the eDRX cycle threshold; and in response to the eDRX cycle being longer than the eDRX cycle threshold, configuring or performing Access Stratum (AS) related functions of the wireless terminal.

In some embodiments, another method performed by a wireless terminal in a wireless network is disclosed. The method may include receiving a first message from a wireless communication node in the wireless network comprising a threshold parameter set associated with signal evaluation by the wireless terminal comprising at least one of: a first threshold parameter; a second threshold parameter; or a signal characteristic based threshold parameter; performing, based on the threshold parameter set, one of: determining a cell coverage level of the wireless terminal; triggering a neighbor cell measurement; or determining a candidate cell for cell selection or re-selection.

In some embodiments, another method performed by a wireless terminal in a wireless network is disclosed. The method may include receiving a first message from a wireless communication node in the wireless network, the first message comprises at least one of: a signal characteristic based threshold parameter set comprising at least one signal characteristic based threshold parameter; a temporal duration; or a candidate neighbor cell count denoted by M; sampling an RSRP or an RSRQ over the temporal duration corresponding to each of a serving cell and neighbor cells of the wireless terminal; ranking the neighbor cells based on the RSRP or the RSRQ of the neighbor cells and selecting top M neighbor cells based on the ranking result, M being a non-negative integer; summing up the sampling RSRP or the RSRQ of each of the serving cell and the M neighbor cells to obtain a total value; and determining a cell coverage condition of the wireless terminal based on the total value, and the signal characteristic based threshold parameter set.

In some embodiments, another method performed by a wireless terminal in a wireless network is disclosed. The method may include receiving a first message from a wireless communication node in the wireless network comprising a parameter set comprising at least one of: a first timer value and a second timer value for setting a length of a T310 timer, wherein the first timer value is shorter than the second timer value, the second timer value is applied to the wireless terminal when the wireless terminal is in a connected mode, and the T310 timer is associated with physical layer issues of the wireless terminal; a temporal duration; or a threshold.

In some embodiments, a method performed by a core network node in a wireless network is disclosed. The method may include receiving a position information of a wireless terminal of the wireless network; sending a message comprising the position information to a wireless communication node serving the wireless terminal in the wireless network.

In some embodiments, there is a wireless communication terminal and/or a core network node comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

The above embodiments and other aspects and alternatives of their implementations are described in greater detail in the drawings, the descriptions, and the claims below.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

Certain features are described using the example of non-terrestrial network. However, applicability of the disclosed techniques is not limited to only non-terrestrial network, and the disclosed implementations are applicable to any wireless systems. Section headings are used in the present disclosure only to improve readability and do not limit the scope of the disclosed embodiments and techniques in each section to only that section.

Wireless Communication Network

Figure 1:
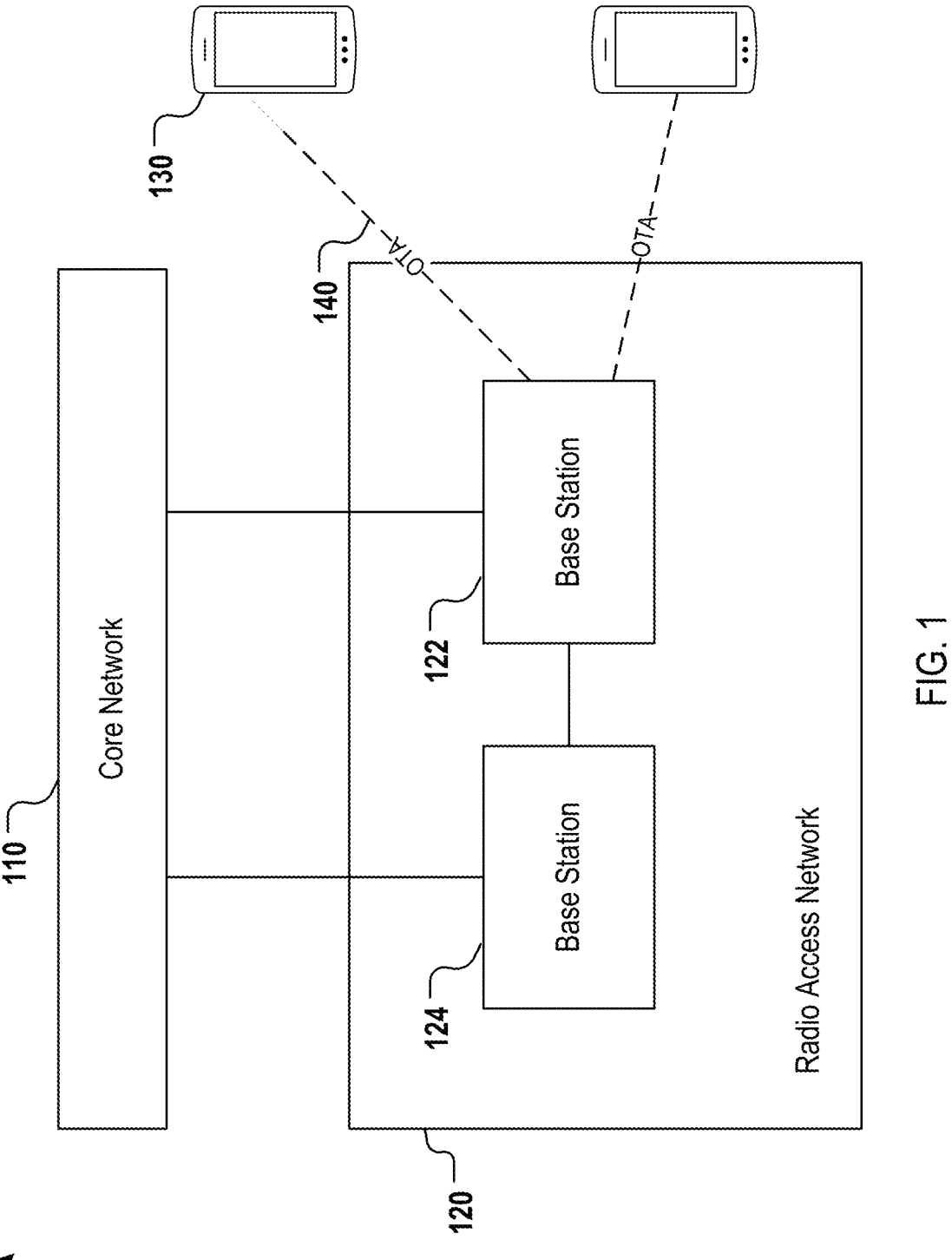
FIG. 1 shows an example wireless communication network.

FIG. 1 shows an example cellular wireless communication network 100 (also referred to as wireless communication system) that includes a core network 110 and a radio access network (RAN) 120. The RAN 120 further includes multiple base stations 122 and 124. The base station 122 and user equipment (UE) 130 communicate with one another via Over the Air (OTA) radio communication resources 140. The wireless communication network 100 may be implemented as, as for example, a 2G, 3G, 4G/LTE, or 5G cellular communication network. Correspondingly, the base stations 122 and 124 may be implemented as a 2G base station, a 3G nodeB, an LTE eNB, or a 5G New Radio (NR) gNB. The UE 130 may be implemented as mobile or fixed communication devices installed with SIM/USIM modules for accessing the wireless communication network 100. The UE 130 may include but is not limited to mobile phones, Internet of Things (IoT) devices, Machine-type communications (MTC) devices, laptop computers, tablets, personal digital assistants, wearable devices, distributed remote sensor devices, roadside assistant equipment, and desktop computers. Alternative to the context of cellular wireless network, the RAN 120 and the principles described below may be implemented as other types of radio access networks, such as Wi-Fi, Bluetooth, ZigBee, and WiMax networks.

In the example wireless communication system 100 of FIG. 1 the UE 130 may connect with and establish a communication session with the base station 122 via the OTA interface 140. The communication session between the UE 130 and the base station 122 may utilize downlink (DL) and/or uplink (UL) transmission resources. The DL transmission resource carries data from the base station 122 to the UE 130, and the UL transmission resource carries data from the UE 130 to the base station 122.

The wireless system supports both terrestrial network (TN) deployments and non-terrestrial network (NTN) deployments. For example, TN deployments may be used to serve populous area and NTN deployments may be used to serve sparsely populated area.

Non-Terrestrial Network

In certain areas such as mountains, deserts, oceans, etc., wireless communication network deployments may be expensive. However, with the advancement of science and technology, there is a great demand of data collections and communicate in these remote regions. For example, there may be a need to collect meteorological data at a mountain peak or desert.

Figure 2:
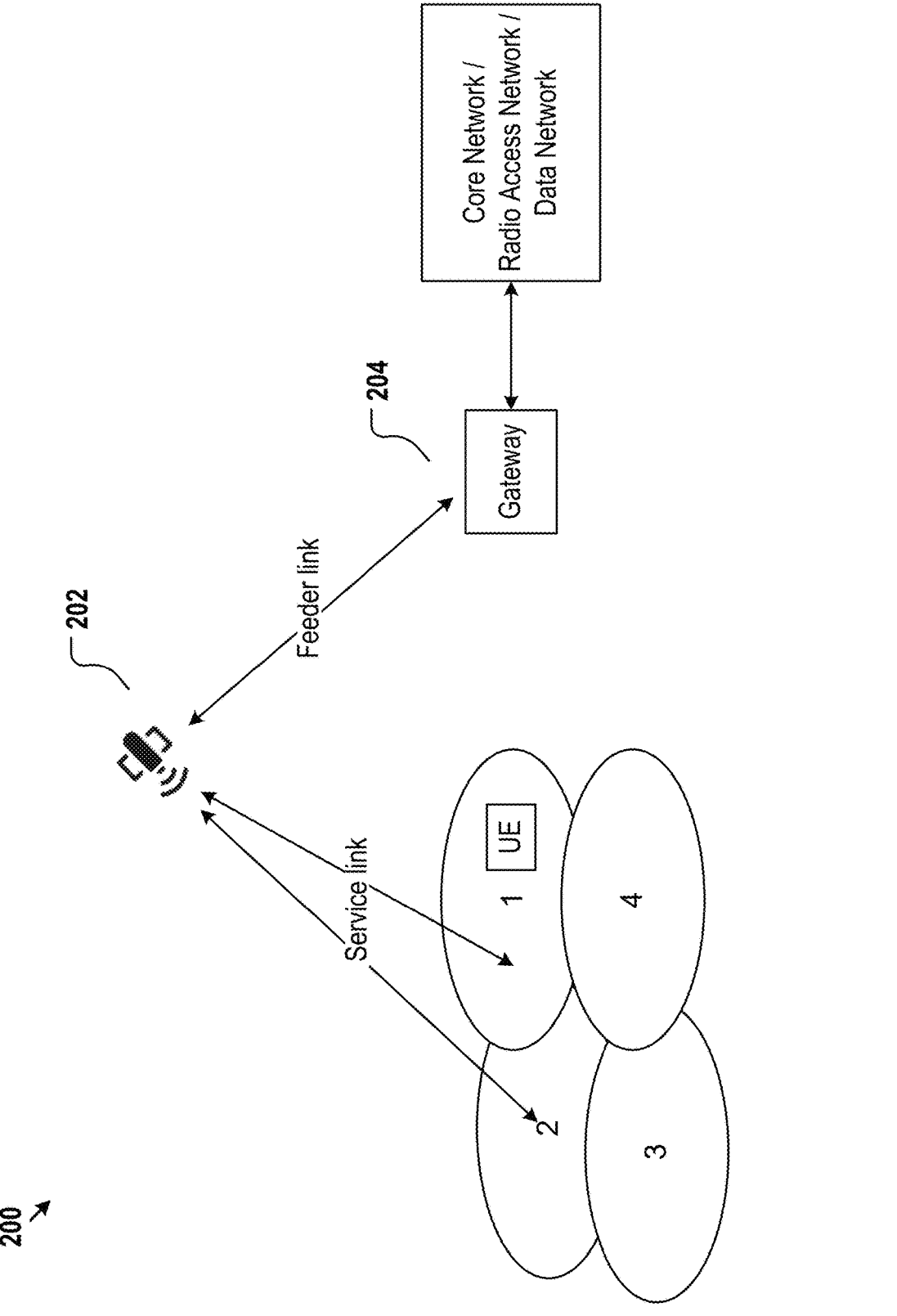
FIG. 2 shows an example non-terrestrial deployment of a wireless network.

In non-terrestrial network (NTN) deployments, a satellite may provide signal coverage to a large area even in the remote regions. The non-terrestrial network may be deployed in addition to a terrestrial network, thereby further extending coverage of, for example a terrestrial cellular network. The satellite may be associated with a base station, or be part of (or as an extension of) the base station. FIG. 2 shows an example non-terrestrial network 200 that provides wireless network access to a UE. In the non-terrestrial network 200, a satellite 202 provides communication links between the ground areas. Similar to a traditional cellular network, the covered ground areas may be divided into cells, or more specifically, satellite cells, such as cells 1 to 4 as shown in FIG. 2. These cells may provide signal coverage for the UE. A radio link between satellite and UE may be referred to as a service link. The satellite 202 may generate several beams over a given service area bounded by its field of view. The footprints of the beams may be of elliptic shapes.

An NTN may include an NTN gateway 204 which may be an earth station located at the surface of earth, and providing sufficient RF power and RF sensitivity for accessing the satellite 202. The NTN Gateway 204 may be a transport network layer (TNL) node and may provide access to, for example, a core network, a radio access network, or a data network. The wireless link between the NTN Gateway 204 and satellite 202 may be referred to as a feeder link.

The satellite may be placed into Low-Earth Orbit (LEO), or Geostationary Earth Orbit (GEO). The geostationary Earth orbit may be a circular orbit at 35,786 km (kilometer) above the earth's equator and following the direction of the Earth's rotation. A GEO satellite in such an orbit may have an orbital period equal to the Earth's rotational period and thus appears motionless, at a fixed position in the sky, to ground observers. The typical beam footprint size of the GEO is about 200-3500 km. The low Earth Orbit may be an orbit around the earth with an altitude between 300 km to 1500 km. A LEO satellite in such an orbit encircle around the earth with the speed of, for example, 7.56 km per second. The beam footprint size of LEO may be 50 km to 1000 km.

Cell Enhanced Coverage

In the wireless communication network 100 and the NTN 200, UE devices, especially eMTC, NB-IoT devices may be deployed in different areas under different level of signal coverage. The signal may be traditional cellular signal, or satellite signal as in the NTN. For example, UEs may be deployed in rural areas such as mountains, desserts, wetlands, etc., or in urban areas. These locations may experience different signal quality. Enhanced coverage (or Coverage enhancement) may be introduced and different coverage conditions may correspond to different coverage enhancement levels (CEL). Different UEs may be in different coverage enhancement levels (CEL), and UEs in different coverage enhancement levels may be configured accordingly to adapt to the various signal coverage conditions.

RSRP (Reference Signal Received Power) and RSRQ (Reference Signal Received Quality) are two important parameters which may be used for the UE to determine coverage conditions. In TN deployments, under traditional cellular signal coverage, for a UE in the cell edge or indoor, when the RSRP/RSRQ of the UE is below a signal threshold, the UE may be considered as in an enhanced coverage. In order to meet the transmission or reception requirements of the UE, repetition transmission of uplink and downlink signals may be adopted. For example, the maximum number of transmission of preamble at every preamble attempt may reach 1024. The coverage can be further divided into multiple coverage levels. Each coverage level may be associated with a different wireless resource. For example, for coverage level 0, or normal coverage, the maximum transmission of preamble at every preamble attempt may be as small as 1; for coverage level 1, the maximum transmission of preamble at every preamble attempt may reach 512; and for coverage level 2, the maximum transmission of preamble at every preamble attempt may reach 1024.

However, in NTN deployments, the RSRP/RSRQ value may have a small dynamic range and the difference of RSRP/RSRQ value between satellite cell center and satellite cell edge may be less than 3 dB, while the RSRP/RSRQ value difference between TN cell center and TN cell edge may be more than 15 dB. Therefore, RSRP/RSRQ may no longer be a good metric to determine the signal strength in NTN. UE activities based on RSRP/RSRQ measurements such as determining coverage level, triggering the neighbor cell measurement, performing cell (re)selection, and the like may need to be adapted under the NTN deployment.

The description below provides in detail implementations and embodiments for NTN satellite cell coverage. extended Discontinuous Reception (eDRX)

UE power consumption is an important factor to consider when designing the wireless communication system. When there is no active communication session between the UE and the satellite, the UE may stay in an idle or inactive state, such as RRC IDLE or RRC INACTIVE state. The UE continues to monitor paging signals while limiting its usage of the radio resources during the idle state to reduce power consumption. For example, the UE may monitor the paging signal by using techniques including but not limited to Discontinuous Reception (DRX) or eDRX. The DRX and eDRX technologies are especially beneficial to low-power devices such as NB-IoT (Internet-of-Things) and eMTC (enhanced Machine Type Communications) devices.

Figure 3:
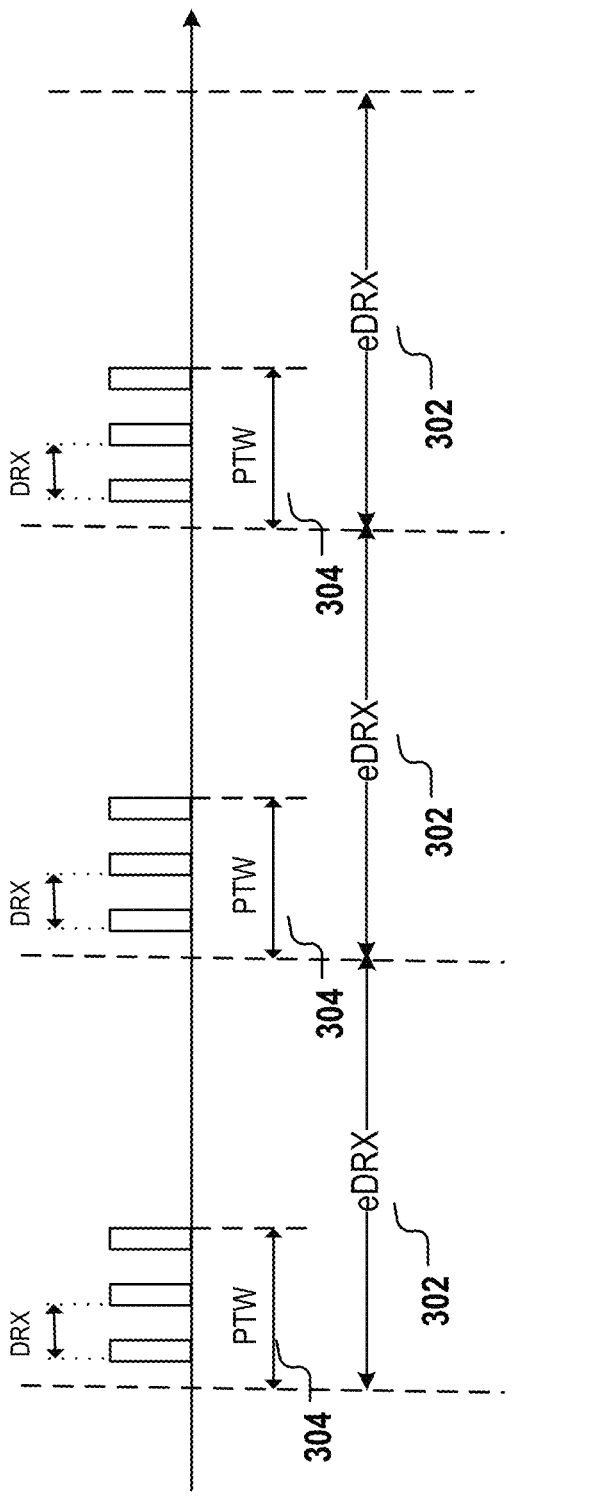
FIG. 3 shows an example extended Discontinuous Reception in a wireless network.

In DRX, resource monitoring and communication activities are managed in cycles, referred to as DRX cycles. Particularly, in wireless communication systems such as LTE and 5G, radio signals are transmitted in radio frames. At a system level, the radio frames are identified in sequence and each radio frame is numbered with a System Frame Number (SFN) that recycles from, for example, 0 to 1023. In the DRX mode, a UE may enter into a sleeping mode to reduce battery consumption. The UE periodically monitors a Paging Occasion (PO). A PO may include a set of Physical Downlink Control Channel (PDCCH) monitoring occasions and can include multiple time slots (e.g. subframe or OFDM symbol) where paging DCI can be sent. The purpose of the periodical monitoring on the PO is to check if there is a paging message for the UE as well as to obtain system information update so that the UE may be able to sync up with the network. If there is no paging message for the particular UE, the UE may return to sleep and wake up to monitor the PO in the next cycle. This cycle is referred to as a paging cycle, or a DRX cycle. The length of the paging cycle is given by the number of radio frames in each cycle and may be configurable to different lengths in the wireless communication system.

eDRX is an extension to the DRX mechanism which provides a longer paging cycle. FIG. 3 shows an example eDRX implementation 300 with eDRX cycle 302. In each eDRX cycle, there is a paging time window (PTW) 304 configured and the UE may only wake up in the PTW. Each PTW may further include multiple DRX cycles (similar to the DRX cycle as describe above), the UE behavior, when in the PTW, is similar to the UE behavior under the DRX mechanism.

Using Narrow Band Internet of Things (NB-IoT) as an example, the eDRX cycle may be as long as 10485.76 seconds (2.91 hours). In eDRX, if the UE is configured with a eDRX cycle more than 512 radio frames, it may monitor POs based on the core network configured UE special DRX value and a default DRX value (broadcast in system information block—SIB) in RRC idle mode, or based on following parameters:

Core network configured UE special DRX value;
   Default DRX cycle and RAN paging cycle in inactive
      mode.

In particular, the UE may monitor the POs throughout a periodic PTW configured for the UE, or until a paging message including the UE's Non Access Stratum (NAS) identity is received during the PTW. The PTW may be UE-specific and may be determined by a Paging Hyperframe (PH). The PH computation may be determined by the extended idle mode DRX cycle, and a UE specific identifier. The length of the PTW may be determined by the Paging Time Window length parameter which is provided to the UE during an attach procedure or a Tracking Area Update (TAU) procedure, together with the extended idle mode DRX cycle length parameter. The length of a PTW may be, for example, 1.28 to 40.96 seconds.

Figure 4:
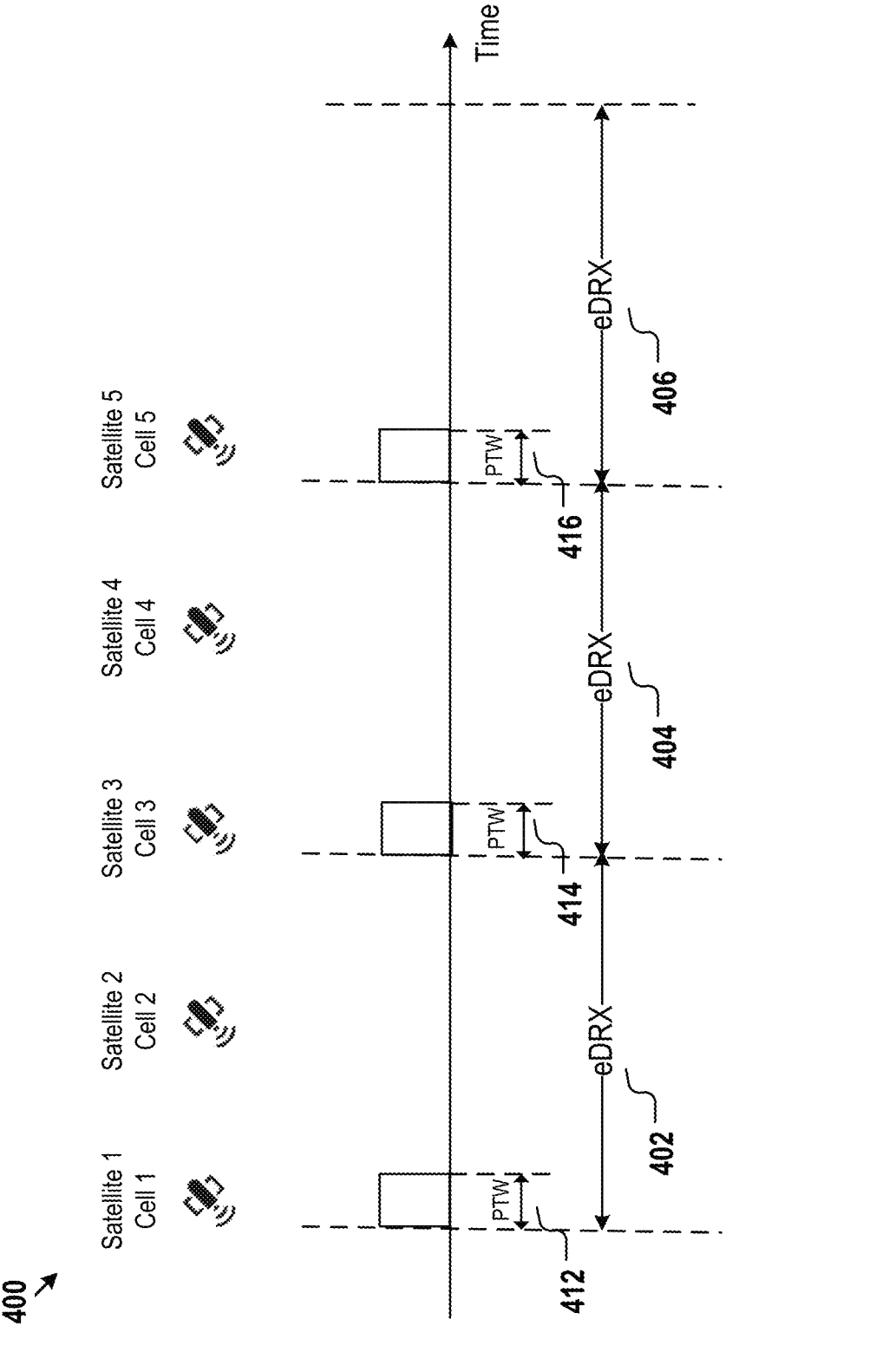
FIG. 4 shows another example extended Discontinuous Reception in a wireless network.

In NTN, a UE may be served by a satellite cell with a diameter ranging from 50 km to 1000 km as covered by a LEO satellite. Assuming the UE is static, the UE may be estimated to remain connected with a same NTN LEO cell for a maximum of 6.61 seconds to 132.38 seconds with respect to the diameter of the cell due to satellite movement. This estimation may vary by approximately +/−4% with consideration of UE movement. Since the satellite is moving, UE may be served by different satellite or satellite cell in a next eDRX cycle. As shown in FIG. 4, in PTW 412 under eDRX 402, a UE is served by satellite 1 cell 1. When UE wakes up in the next PTW 414 under eDRX 404, even if the UE is static, since satellite 1 may have moved away, the UE is now served by satellite 3 cell 3. Similarly, in the next PTW 416 under eDRX 406, the UE is served by satellite 5 cell 5.

In current network implementation, UE performs neighbor cell measurement in RRC idle or inactive mode. In NTN scenario, as described above, the time that a satellite cell serves an area is so short compared with an eDRX cycle that a UE configured with eDRX may not follow the change of the neighbor cell and may fail to get a correct measurement result. For example, as shown in FIG. 4, in eDRX cycle 402, cell 1 and cell 2 are serving the UE's surrounding area, UE can measure cell 1 and cell 2. However in the next eDRX cycle 404, cell 1 and cell 2 move away and stop serving this area, and new cells, such as cell 3 and cell 4 are now serving this area. As such, the measurement in eDRX cycle 402 becomes stale and may be not be useful anymore.

In some embodiments, considering that power saving is critical, the detection, measurement, or evaluation of cell re-selection criteria for the neighbor cell may be canceled. For example, the base station may configure a UE in RRC message or broadcast in system information (SI) to prohibit cell search, cell measurement, or cell evaluation for cell re-selection if the UE is configured with certain eDRX cycle. The aforementioned operations may be intra-frequency or inter-frequency.

In some embodiments, the base station may configure an eDRX cycle threshold to the UE such that if the UE's eDRX cycle is longer than the eDRX cycle threshold, the aforementioned cell search, cell measurement, or cell evaluation for cell re-selection operations may be prohibited. Optionally, the prohibition may be applies when certain pre-conditions are met. These pre-conditions, for example, may include:

The UE is in a PTW;
   The UE is camping on a cell; or
   The serving cell of the UE satisfies a cell selection
      criteria.

Optionally, the prohibition may apply to a certain time frame, for example, every eDRX cycle, or every multiple of eDRX cycles, or a time frame defined by a timer or another mechanism. The base station may send the number of eDRX cycles or the time frame to the UE. As an example, assuming the time frame is 6 eDRX cycles, the cell search may be prohibited when the UE is in one of the PTWs in every 6 eDRX cycles. The PTW may be any one of the PTWs in the 6 eDRX cycles. In some implementations, a timer set with the length of the time frame may be started when the UE camps on a cell, or receives the system information from the serving cell, or receives the timer value (i.e., length) of this particular timer. The value for this particular timer may be broadcast or configured by the base station.

In some embodiments, the principle above may be adapted to the cell re-selection procedure. For example, if the UE's eDRX cycle is longer than the eDRX cycle threshold, the cell re-selection procedure may be canceled. The preconditions and the time frame described above may also apply.

In some embodiments, if the UE's eDRX cycle is longer than the eDRX cycle threshold, the UE may deactivate or stop its Access Stratum functions after the PTW during an eDRX cycle, or after one of the PTWs during a multiple of eDRX cycles and the PTW may be any one of the PTWs in the multiple of eDRX cycles. The same principle may also apply to a certain time frame as describe above. The Access Stratum functions include:

Cell search function;

Cell measurement function;

Evaluation of cell re-selection for a neighbor cell of the UE;

Cell re-selection procedure;

Cell selection procedure; or

Reception of paging message.

In some embodiments, the Access Stratum functions include all idle mode procedures.

In some embodiments, if the UE's eDRX cycle is longer than the eDRX cycle threshold, the UE activates or resumes its Access Stratum functions at the beginning of the PTW during an eDRX cycle, or at the beginning of a PTW during a multiple of eDRX cycles and the PTW may be any one of the PTWs in the multiple of eDRX cycles. The same principle may also apply to a certain time frame as describe above.

In some embodiments, if the UE's eDRX cycle is longer than the eDRX cycle threshold, the UE performs cell selection procedure at the beginning of the PTW during an eDRX cycle, or at the beginning of a PTW during a multiple of eDRX cycles and the PTW may be any one of the PTWs in the multiple of eDRX cycles. The same principle may also apply to a certain time frame as describe above. If a cell satisfies a cell selection criteria such as the S criteria during the cell selection, the UE may camp on this cell.

In some embodiments, a UE configured with eDRX does not perform the intra-frequency or inter-frequency search or measurement or evaluation outside the PTW. The UE may begin to perform these operations immediately before the Random Access procedure initialization, or immediately before the PTW. The UE performs these operations during the PTW based on the measurement and evaluation requirement for cell selection and re-selection (e.g., if the relaxed monitoring is not configured).

It is to be understood that the implementations with eDRX cycle are exemplary. The same principle may be apply to other implementations such as DRX cycle, or the like.

Coverage Condition Determination

As described earlier, the RSRP/RSRQ value, due to the small dynamic range under NTN deployments, is no longer a suitable metric to be used for determining a UE's enhanced coverage condition. A UE's enhanced coverage condition may include whether the UE is in enhanced coverage, or a coverage level of the UE. Instead of using RSRP/RSRQ, the UE may determine the enhanced coverage condition based on a location relationship between itself and a satellite providing cell coverage. Such location relationship may be an absolute relationship, such as a distance or an elevation angle between the UE and the satellite. Alternatively, such location relationship may also be a relative relationship, such as a timing advance between the UE and the satellite. Alternatively, the location relationship may also be a location relationship between the UE and a reference point relative to the satellite which implicitly indicates the location relationship between the UE and the satellite. For example, such a reference point may include a cell covered by the satellite, or a specific location such as the cell center of the cell, or another predefined location associated with the satellite. Various embodiments for determining UE coverage level based on the location relationship are described below.

Distance

In some embodiments, the distance between UE and satellite associated with serving cell of the UE may be used to determine the coverage condition of the UE in NTN. For example, if the UE has the capability of Global Navigation Satellite System (GNSS), the UE may determine its own position. The base station may send the ephemeris data of the satellite to the UE via a broadcast message (e.g., SI) or a dedicated message. Therefore the UE may be able to determine the position of the satellite based on the ephemeris data of the satellite. Based on the position of the UE and the satellite, the UE may calculate the distance between the UE and the satellite. If the distance is higher than a distance threshold, UE may be considered as in enhanced coverage or in a specific coverage level. The UE may also compare the distance with multiple thresholds, to determine a specific coverage level. Furthermore, in some implementations, the RSRP/RSRQ of the serving cell may further be compared with another threshold, together with the distance comparison, to identify the cell coverage level. Table 1 below shows an example on how to determine the coverage level based on the distance.

TABLE 1

| Distance based coverage condition determination | | |
|---|---|---|
| Distance (d) | RSRP/RSRQ (optional) | Coverage level |
| threshold 1 < d < threshold 2 | (RSRP/RSRQ) > threshold 3 | 1 |
| threshold 2 < d | (RSRP/RSRQ) > threshold 3 | 2 |

The distance threshold values used in the comparison may be predefined or configurable. The base station may send the threshold values to the UE, for example, in a broadcast message (e.g., SI), or in a Radio Resource Control (RRC) message. Similarly, the base station may also send a resource configuration corresponding to the coverage condition such as coverage level to the UE.

Elevation Angle

In some embodiments, the elevation angle between UE and satellite associated with the serving cell of the UE may be used to determine the coverage condition of the UE in NTN. For example, if the UE has the capability of Global Navigation Satellite System (GNSS), UE may determine its own position. The UE may also be able to determine the position and the height of the satellite based on the ephemeris data of the satellite. Based on the position of the UE, and the position and the height of the satellite, the UE may calculate the elevation angle between the UE and the satellite. Similar to the distance concept described above, the elevation angle may also be an elevation angle between the UE and a reference point. If the elevation angle is higher than an angle threshold, UE may be considered as in enhanced coverage or in a specific coverage level. The UE may also compared the elevation angle with multiple thresholds, to determine a specific coverage level. Furthermore, in some implementations, the RSRP/RSRQ value may further be compared with another threshold, together with the elevation angle comparison, to identify the cell coverage level. Table 2 below shows an example on how to determine the coverage level based on the elevation angle.

TABLE 2

| Elevation angle based coverage condition determination | | |
|---|---|---|
| Elevation angle (ea) | RSRP/RSRQ (optional) | Coverage level |
| threshold 1 < ea < threshold 2 | (RSRP/RSRQ) > threshold 3 | 1 |
| threshold 2 < ea | (RSRP/RSRQ) > threshold 3 | 2 |

The angle threshold values used in the comparison may be predefined or configurable. The base station may send the threshold values to the UE, for example, in a broadcast message (e.g., SI), or in a Radio Resource Control (RRC) message. Similarly, the base station may also send a resource configuration corresponding to the coverage condition such as coverage level to the UE.

Timing Advance

In some embodiments, the timing advance between UE and satellite associated with the serving cell of the UE may be used to determine the coverage condition of the UE in NTN. For example, if the UE has the capability of Global Navigation Satellite System (GNSS), UE may determine its own position. The UE may also be able to determine the position and the height of the satellite based on the ephemeris data of the satellite. Based on the position of the UE, and the position and the height of the satellite, the UE may calculate the timing advance between the UE and the satellite. Similar to the distance concept described above, the timing advance may also be a timing advance between the UE and a reference point. If the timing advance is higher than a timing threshold, UE may be considered as in enhanced coverage or in a specific coverage level. The UE may also compared the timing advance with multiple thresholds, to determine a specific coverage level. Furthermore, in some implementations, the RSRP/RSRQ value may further be compared with another threshold, together with the timing advance comparison, to identify the cell coverage level. Table 3 below shows an example on how to determine the coverage level based on the timing advance.

TABLE 3

| Timing advance based coverage condition determination | | |
|---|---|---|
| Timing advance (ta) | RSRP/RSRQ (optional) | Coverage level |
| threshold 1 < ta < threshold 2 | (RSRP/RSRQ) > threshold 3 | 1 |
| ta < threshold 1 | RSRP/RSRQ) > threshold 3 | 2 |

The timing threshold values used in the comparison may be predefined or configurable. The base station may send the timing threshold values to the UE, for example, in a broadcast message (e.g., SI), or in a Radio Resource Control (RRC) message. Similarly, the base station may also send a resource configuration corresponding to the coverage condition such as coverage level to the UE.

Time

In some embodiments, the time that UE camps on or receives the system information from entering idle mode or inactive mode in the serving cell may be used to determine the coverage condition of the UE in NTN. For example, UE select a cell to camp on. From that on, UE starts a timer. If the length of timer is higher than a time threshold, UE may be considered as in enhanced coverage or in a specific coverage level. The UE may also compares the time with multiple thresholds, to determine a specific coverage level. Furthermore, in some implementations, the RSRP/RSRQ value may further be compared with another threshold, together with the time comparison, to identify the cell coverage level. Table 4 below shows an example on how to determine the coverage level based on the timing advance.

TABLE 4

| Timing advance based coverage condition determination | | |
|---|---|---|
| Time (time) | RSRP/RSRQ (optional) | Coverage level |
| threshold 1 < time < threshold 2 | (RSRP/RSRQ) > threshold 3 | 1 |
| time < threshold 1 | (RSRP/RSRQ) > threshold 3 | 2 |

The time threshold values used in the comparison may be predefined or configurable. The base station may send the time threshold values to the UE, for example, in a broadcast message (e.g., SI), or in a Radio Resource Control (RRC) message. Similarly, the base station may also send a resource configuration corresponding to the coverage condition such as coverage level to the UE.

NGSS

In some embodiments, the GNSS signal of the satellite associated with the serving cell may be used to determine whether a UE is in enhanced coverage. For example, the GNSS signal coverage may be better outdoor than indoor. The satellite signal coverage in the NTN may be reflected by the reception quality of the GNSS signal. Therefore, if UE is not able to get the GNSS signal, the UE may be considered as in enhanced coverage. The feature of determining the enhanced coverage based on the NGSS signal may be turned on or turned off by the base station, for example, by using a broadcast message or an RRC message.

RSRP/RSRQ Variation

In some embodiments, the variation of RSRP/RSRQ value measured in the serving cell of a UE over a time duration may be used to determine whether the UE is in enhanced coverage. In some situations, if the variation of RSRP/RSRQ measured is too small (e.g., smaller than a predetermined threshold), the sum of the variation of RSRP/RSRQ measured in multiple cells including the serving cell and neighbor cells may be used. In particular, the neighbor cell may be the best N neighbor cells based on the UE measurement. The base station may send a configuration including one or more thresholds of the variation of RSRP/RSRQ for determining coverage condition, a number of neighbor cells to be selected denoted as N, and the time duration for the RSRP/RSRQ variation via broadcast or RRC message. For example, there may be two satellites providing the cell coverage, such as cell 1 as serving cell, cell 2, cell 3, and cell 4 as neighbor cells. Based on the configuration sent from the base station, the UE may calculate the variation of RSRP/RSRQ during the configured time period in cell 1, cell 2, cell 3, and cell 4. UE may rank the cell 2, cell3 and cell4 based on the RSRP/RSRQ, select the configured number of the highest ranking cells (such as cell 3 and cell 4, if N is configured to be 2), and sum up the variation of RSRP/RSRQ of those selected neighbor cells and the serving cell (i.e., cell 3, cell 4, and cell 1). When the sum of variation of RSRP/RSRQ is less than a threshold 1, and higher than a threshold 2, the UE may be considered to be in coverage level 1. When the variation of RSRP/RSRQ is less than a threshold 1, the UE may be considered to be in coverage level 2.

In some embodiments, the RSRP/RSRQ value measured in the serving cell and neighbor cells of a UE may be used to determine whether the UE is in enhanced coverage. The sum of the RSRP/RSRQ value of the serving cell and the best N neighbor cells, may be used to compare with a corresponding threshold or a threshold range, to determine the coverage level. For example, in some situations, if the RSRP/RSRQ measured in the neighbor cell is too small (e.g., smaller than a predetermined threshold), the sum of the variation of RSRP/RSRQ measured in multiple cells including the serving cell and neighbor cells may be used. For another example, when the sum of RSRP/RSRQ is less than a threshold 1, and higher than a threshold 2, the UE may be considered to be in coverage level 1. When the sum of RSRP/RSRQ variation is less than a threshold 3, the UE may be considered to be in coverage level 2.

These embodiments may be combined together. For example, by using the combination of distance and timing advance between the UE and the satellite and the RSRP to determine whether the UE is in enhanced coverage; or by using the distance and elevation angle between UE and satellite and the RSRP to determine whether the UE is in enhanced coverage. There is no limitation as to the manner in which the embodiments above may be combined.

It should be understood that, all the comparisons using the thresholds described above are for exemplary purpose only. The comparison may be changed from ">" to "<", or vice versa.

Neighbor Cell Measurement

For UE devices, especially NB-IoT or eMTC (enhanced Machine Type Communications) devices, power saving is a critical design consideration. For NB-IoT/eMTC devices, some power consumption intensive function may be temporarily disabled or conditionally disabled. For example, for NB-IoT UE, the neighbor cell measurement in RRC connected mode may not be supported, in order to save energy. When a UE moves to another cell, The UE needs to search a target cell which involves cell measurement during an RRC reestablishment procedure. This procedure may result in a long interruption time. In order to reduce the interruption time and save energy, the cell measurement may be conditionally performed. Only when a certain condition is satisfied, the neighbor cell measurement in RRC connected mode may be triggered. In TN deployments, the condition may be that the RSRP is lower than a threshold, and so on. However, in NTN deployments, the dynamic range of the RSRP/RSRQ value between satellite cell center and satellite cell edge may be small and the RSRP/RSRQ value may not be a good metric to be used for determining whether UE may trigger the neighbor cell measurement in NTN. Similar to embodiments above, instead of using RSRP/RSRQ, the UE may determine whether to trigger neighbor cell measurement based on a location relationship between itself and a satellite providing a cell coverage. Such location relationship may include a distance relationship, an elevation angle relationship, or a timing advance relationship. Various embodiments for determining whether the UE needs to trigger neighbor cell measurement are disclosed below.

Distance

As described above, the UE may determine a distance to a satellite associated with a neighbor cell. The UE may determine whether to trigger the neighbor cell measurement based on the distance and a distance threshold value. Furthermore, in some implementations, the RSRP/RSRQ value of the serving cell value may further be compared with another threshold, together with the distance comparison, to determine whether to trigger the neighbor cell measurement. Table 5 below shows an example on how to determine whether to trigger the neighbor cell measurement.

TABLE 5

| Distance based neighbor cell measurement triggering | | |
|---|---|---|
| Distance (d) | RSRP/RSRQ (optional) | Trigger the neighbor cell measurement? |
| d > threshold 1 | (RSRP/RSRQ) > threshold 1 | Yes |

The distance threshold values used in the comparison may be predefined or configurable. The base station may send the threshold values to the UE, for example, in a broadcast message (e.g., SI), or in a Radio Resource Control (RRC) message.

Elevation Angle

As described above, the UE may determine an elevation angle to a satellite associated with a neighbor cell. The UE may determine whether to trigger the neighbor cell measurement based on the elevation angle and a threshold value. Furthermore, in some implementations, the RSRP/RSRQ value of the serving cell value may further be compared with another threshold, together with the elevation angle comparison, to determine whether to trigger the neighbor cell measurement. Table 6 below shows an example on how to determine whether to trigger the neighbor cell measurement.

TABLE 6

| Elevation angle based neighbor cell measurement triggering | | |
|---|---|---|
| Elevation angle (ea) | RSRP/RSRQ (optional) | Trigger the neighbor cell measurement? |
| ea < threshold 1 | (RSRP/RSRQ) > threshold 2 | Yes |

The angle threshold values used in the comparison may be predefined or configurable. The base station may send the threshold values to the UE, for example, in a broadcast message (e.g., SI), or in a Radio Resource Control (RRC) message.

Timing Advance

As described above, the UE may determine a timing advance to a satellite associated with a neighbor cell. The UE may determine whether to trigger the neighbor cell measurement based on the timing advance and a threshold value. Furthermore, in some implementations, the RSRP/RSRQ value of the serving cell value may further be compared with another threshold, together with the timing advance comparison, to determine whether to trigger the neighbor cell measurement. Table 7 below shows an example on how to determine whether to trigger the neighbor cell measurement.

TABLE 7

| Timing advance based neighbor cell measurement triggering | | |
|---|---|---|
| Timing advancement (ta) | RSRP/RSRQ (optional) | Trigger the neighbor cell measurement? |
| ta > threshold 1 | (RSRP/RSRQ) > threshold 2 | Yes |

The timing threshold values used in the comparison may be predefined or configurable. The base station may send the threshold values to the UE, for example, in a broadcast message (e.g., SI), or in a Radio Resource Control (RRC) message.

Time

As described above, the UE may determine a time that UE keep connected with the serving cell. For example, when UE enter into RRC connected mode, UE starts a timer. The UE may determine whether to trigger the neighbor cell measurement based on the time and a threshold value. Furthermore, in some implementations, the RSRP/RSRQ value of the serving cell value may further be compared with another threshold, together with the time, to determine whether to trigger the neighbor cell measurement. Table 8 below shows an example on how to determine whether to trigger the neighbor cell measurement.

TABLE 8

| Timing advance based neighbor cell measurement triggering | | |
|---|---|---|
| Time (time) | RSRP/RSRQ (optional) | Trigger the neighbor cell measurement? |
| time > threshold 1 | (RSRP/RSRQ) > threshold 2 | Yes |

The time threshold values used in the comparison may be predefined or configurable. The base station may send the threshold values to the UE, for example, in a broadcast message (e.g., SI), or in a Radio Resource Control (RRC) message.

These embodiments may be combined together. For example, by using the combination of elevation angle and distance between the UE and the satellite and the RSRP to determine whether to trigger neighbor cell measurement; or by using the distance and elevation angle between UE and satellite and the RSRP to determine whether to trigger neighbor cell measurement. There is no limitation as to the manner in which the embodiments above may be combined.

Cell Selection

In TN deployments, UE performs cell selection/reselection procedure according to the RSRP/RSRQ values of neighbor cells. For example, UE may rank the neighbor cells based on RSRP/RSRQ values of candidate cells and reselect the highest ranking cell. In NTN deployments, as described above, due to its small dynamic range, RSRP/RSRQ value may not be a good metric to be used for determining the candidate cell for cell selection/reselection procedure in NTN. Various embodiments for determining the candidate cell are disclosed below.

Distance

As described above, the UE may determine a distance to a satellite associated with a neighbor cell. The UE may determine the candidate cell for cell selection/reselection based on the distance. For example, if the distance is less than a threshold, and the neighbor cell further satisfies a criteria for cell reselection, such as an S criteria, then the neighbor cell may be considered as a candidate cell. Table 9 below shows an example on how to determine the candidate cell.

TABLE 9

| Distance based candidate cell selection | | |
|---|---|---|
| Distance (d) | Satisfy S criteria? | Candidate cell? |
| d < threshold 1 | Yes | Yes |

The distance threshold values used in the comparison may be predefined or configurable. The base station may send the threshold values to the UE, for example, in a broadcast message (e.g., SI), or in a Radio Resource Control (RRC) message.

Furthermore, in case there are multiple candidate cells, the UE may rank the candidate cells based on the respective distance between the UE and each of the candidate cells in ascending order and select the best ranking cell.

Elevation Angle

As described above, the UE may determine an elevation angle to a satellite associated with a neighbor cell. The UE may determine the candidate cell for cell selection/reselection based on the elevation angle. For example, if the elevation angle is higher than a threshold, and the neighbor cell further satisfies a criteria for cell reselection, such as an S criteria, then the neighbor cell may be considered as a candidate cell. Table 10 below shows an example on how to determine the candidate cell.

TABLE 10

| Elevation angle based candidate cell selection | | |
|---|---|---|
| Elevation angle (ea) | Satisfy S criteria? | Candidate cell? |
| ea > threshold 1 | Yes | Yes |

The angle threshold values used in the comparison may be predefined or configurable. The base station may send the threshold values to the UE, for example, in a broadcast message (e.g., SI), or in a Radio Resource Control (RRC) message.

Furthermore, in case there are multiple candidate cells, the UE may rank the candidate cells based on the respective elevation angle between the UE and each of the candidate cells in descending order and select the best ranking cell.

Timing Advance

As described above, the UE may determine a timing advance to a satellite associated with a neighbor cell. The UE may determine the candidate cell for cell selection/reselection based on the timing advance. For example, if the timing advance is higher than a threshold, and the neighbor cell further satisfies a criteria for cell reselection, such as an S criteria, then the neighbor cell may be considered as a candidate cell. Table 11 below shows an example on how to determine the candidate cell.

TABLE 11

| Timing advance based candidate cell selection | | |
|---|---|---|
| Timing advance (ta) | Satisfy S criteria? | Candidate cell? |
| ta > threshold 1 | Yes | Yes |

The timing threshold values used in the comparison may be predefined or configurable. The base station may send the threshold values to the UE, for example, in a broadcast message (e.g., SI), or in a Radio Resource Control (RRC) message.

Furthermore, in case there are multiple candidate cells, the UE may rank the candidate cells based on the respective timing advance between the UE and each of the candidate cells in ascending order and select the best ranking cell.

Similarly, these embodiments may be combined together and there is no limitation as to the manner in which the embodiments above may be combined.

RRC Reestablishment Procedure

A UE may periodically monitor its radio link. The physical layer of the UE may evaluates the quality of reception signals. If the quality of reception signals is below a threshold, the physical layer of the UE indicates an out-of-sync indication to the RRC layer of the UE. If the quality of signals is above a threshold for the duration of a time period, the physical layer of the UE indicates an in-sync indication to the RRC layer of the UE. When the RRC layer receives an out-of-sync indication, the RRC starts a T310 timer. When RRC receives d predetermined number of in-sync indications and if the T310 timer is running, the UE may stop the T310 timer. If the T310 expires, a radio link failure occurs and an RRC reestablishment procedure is triggered.

In NTN deployments, due to the movement of a LEO satellite and if the LEO satellite is moving away from the UE, the distance between the UE and the LEO satellite becomes longer and longer until the UE switches to another satellite. Therefore, the radio link between UE and serving cell associated with the LEO satellite may only become worse and there may be little chance for the UE to recovery the radio link, if the LEO satellite serving the UE is moving away. Under the NTN deployments, various embodiments for a fast radio link failure recovery procedure are disclosed below.

In some embodiments, to recover from the radio link failure, the UE may trigger a RRC reestablishment procedure under certain conditions with respect to the satellite associated with the serving cell of the UE, which are listed in Table 12 below.

TABLE 12

| RRC reestablishment triggering condition | | |
|---|---|---|
| RRC reestablishment triggering condition | T310 timer running? | Trigger RRC reestablishment? |
| distance > threshold 1 | Yes | Yes |
| increment of the distance in a given time period > threshold 1 | Yes | Yes |
| time advance > threshold 1 | Yes | Yes |
| increment of the time advance in a given time period > threshold 1 | Yes | Yes |
| elevation angle < threshold 1 | Yes | Yes |
| decrement of elevation angle in a given time period > threshold 1 | Yes | Yes |
| Time that UE keep connected with the serving cell > threshold 1 | Yes | Yes |

For example, the distance, elevation angle, time advance and time as shown in Table 12 may be all between the UE and the satellite associated with the serving cell of the UE.

In some embodiments, to recover from the radio link failure, the UE may trigger a RRC reestablishment procedure under certain conditions with respect to the satellite associated with the neighbor cell of the UE, which are listed in Table 13 below.

TABLE 13

| RRC reestablishment triggering condition | | |
|---|---|---|
| RRC reestablishment triggering condition | T310 timer running? | Trigger RRC reestablishment? |
| distance < threshold 1 | Yes | Yes |
| decrement of the distance in a given time period > threshold 1 | Yes | Yes |
| time advance < threshold 1 | Yes | Yes |
| decrement of the time advance in a given time period > threshold 1 | Yes | Yes |
| elevation angle > threshold 1 | Yes | Yes |
| increment of elevation angle in a given time period > threshold 1 | Yes | Yes |

For example, distance, elevation angle, and time advance may be all between the UE and the satellite associated with the neighbor cell of the UE.

The threshold values used in the comparison may be predefined or configurable. The base station may send the threshold values to the UE, for example, in a broadcast message (e.g., SI), or in a Radio Resource Control (RRC) message.

Dual T310 Timer Value

The RRC layer of a UE receives in-sync or out-of-sync indication from its physical layer. When RRC receives an in-sync-indication and if the T310 timer is running, the UE may stop the T310 timer. Otherwise if the T310 expires, a radio link failure occurs and an RRC reestablishment procedure is triggered.

To reduce the delay in the radio link failure procedure, one of the solution may be configuring at least two different timer values for the T310 timer. A UE may choose to apply the T310 timer with a shorter value to reduce the time for recovering the radio link which further increases the successful rate of the radio link failure recovery in the network.

Depending on the UE status, such as inactive, idle, connected, or other status such as faulty status, it may be beneficial for the UE to be configured with two T310 timer value: a longer one and a shorter one.

The base station may send these two timer values to the UE, for example, in a broadcast message (e.g., SI), or in a Radio Resource Control (RRC) message. When the UE enters into connected mode, the UE may apply the longer value for the T310 timer. Optionally, when the RRC layer receives less than M out-of-sync indications from the physical layer, the UE may apply the longer value for the T310 timer, where M is a positive integer and is also referred to as an out-of-sync indication threshold. For example, If M=3, then for the first two out-of-sync indication, UE may apply the T310 time with longer value. On the other hand, when at least one of these conditions is satisfied, the UE may apply the shorter value for the T310 timer:

A measurement condition is satisfied:

The RSRP/RSRQ value of the serving cell is lower than a RSRP/RSRQ threshold for a time period;

The RSRP/RSRQ value of the neighbor cell is higher than a threshold for a time period; or The RSRP/RSRQ value of the neighbor cell is higher than serving cell by a threshold for a time period.

The out-of-sync indications received by the RRC reaches an out-of-sync indication threshold as described above, which is denoted by M;

The maximum number of retransmission is reached. The retransmission may include ARQ (Automatic Repeat Request) or HARQ (Hybrid ARQ) retransmission.

For example, If M=3, then once the number of out-of-sync indications reaches 3, the shorter value may be applied to the T310 timer.

In some implementations, a shorter value may override a longer value even if the T310 timer is running.

The aforementioned RSRP/RSRQ threshold, out-of-sync indication threshold, maximum number of retransmission, and the time period may be sent to the UE by the base station, for example, in a broadcast message (e.g., SI), or in an RRC message.

UE Position Information

In idle or inactive mode, UE may need to update the core network with UE's current serving cell and tracking area information. This way the core network is able to keep track of UE's position in order to send paging message to the UE when needed. In NTN deployments, even the UE is static, the serving cell of the UE may change due to the movement of the LEO satellite supporting the serving cell. If the serving cell changes frequently, UE may need to perform cell reselection to find another cell even if the UE is static. In addition, if the tracking area changes frequently, UE need to perform tracking area update procedure to inform the base station about the current tracking area even if the UE is static. In some scenarios, for example, the UE is static, and the serving base station of the UE may be unchanged. If the serving base station keeps track of UE's position, it may save the UE's effort to perform the cell reselection procedure or the tracking area update procedure.

In a connected mode, UE may need to perform handover when moving to another cell if the serving cell of the UE meets certain condition, e.g., if the signal quality of the serving cell drops below a threshold or when another cell may provide better signal quality. In NTN deployments, the RSRP/RSRQ of a cell may not be reliable to be used as the condition of handover for at least the reason of a small dynamic range. In this case, the UE's position may be used to help the base station determine whether to trigger a handover on the UE. Therefore, it may be beneficial for the base station to be informed about the position of UE.

In some embodiments, if UE has the GNSS capability, the UE may obtain its own position information and report it to the core network via a Non Access Stratum (NAS) message. It is to be understood that although this message is delivered via the base station, the base station may not be able to decode it. Instead, the position information may be forwarded to the base station by the core network.

The core network may send the position information to the base station via a message, for example, an E-RAB setup response message, an E-RAB modify request message, an E-RAB release command, an E-RAB modification indication, an E-RAB modification confirm message, an initial context setup request, a UE context release command, a UE context modification request, a UE context modification confirm, a UE context suspend response, a UE context resume response, a UE information transfer message, an MME cp relocation indication message, a handover command, a handover request, a path switch request acknowledge, a downlink NAS transport message, or a paging message, or other messages.

The position information may include the longitude of the UE, the latitude of the UE, the relative distance between UE and a reference point of a satellite as described earlier, and the like.

Advanced Satellite Estimate

As shown in FIG. 4, as satellites are moving, a UE may be served by different satellites or cells in different eDRX cycles. It may be beneficial for the UE to have an estimate in advance as to which satellite or cell will serve the UE's area in a future time moment. For example, the estimate may help the UE predict a potential neighbor cell for cell measurement. Using FIG. 4 as an example, at the start of eDRX 402, the UE may predict that satellite 3/cell 3 will be serving the area in eDRX 404. And even satellite 2/cell 2 may have a better signal coverage for the UE during eDRX 402, cell 2 may be a sub-optimal candidate cell compared with cell 3, when the UE wakes up in eDRX 404. As such, cell measurement result may be combined with cell location prediction to achieve better cell selection result.

The base station may predict the location of a satellite based on the ephemeris data and a trajectory of the satellite. The base station may then send the neighbor cell and prediction information to the UE, for example, in a broadcast message (e.g., SI) or an RRC message. The prediction information indicates when a cell will to serve and stop serving an area associated with the UE. The area may be the cell that UE camps on or a specific area around the UE. Based on the prediction information, the UE may be able to determine the cell that will serve the area in a coming eDRX cycle, for example, the coming 5th eDRX cycle, and the UE may perform the neighbor cell measurement for this cell in advance, before the coming 5th eDRX cycle. For example, the UE may perform cell measurement for the cell during the coming 4th eDRX cycle.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method performed by a wireless terminal in a wireless network, the wireless terminal being configured with an extended DRX (eDRX) cycle, and the method comprising:

determining an extended discontinuous reception (eDRX) cycle threshold associated with an access stratum function;

determining a reference time window;

determining whether the eDRX cycle of the wireless terminal is longer than the eDRX cycle threshold; and in response to the eDRX cycle being longer than the eDRX cycle threshold, configuring or performing Access Stratum (AS) related functions of the wireless terminal via one of following manners:

manner 1) canceling or prohibiting the AS related functions; or manner 2) determining a PTW within the reference time window; and enabling a cell selection function at the beginning of the determined PTW.

2. The method of claim 1, wherein:

the AS related functions comprise at least one of:

a cell search function;

a cell measurement function;

an evaluation of cell re-selection for a neighbor cell of the wireless terminal;

a cell re-selection procedure; or a cell selection procedure; and the AS related functions comprise functions of at least one of following categories:

an inter-frequency category; or an intra-frequency category.

3. The method of claim 1, wherein:

after determining whether the eDRX cycle is longer than the eDRX cycle threshold, the method further comprises determining whether a precondition is met; and in response to the eDRX cycle being longer than the eDRX cycle threshold, configuring or performing the AS related functions of the wireless terminal comprises:

in response to the eDRX cycle being longer than the eDRX cycle threshold and the precondition being met, configuring or performing the AS related functions of the wireless terminal.

4. The method of claim 3, wherein the precondition comprises at least one of:

the wireless terminal being in a paging time window (PTW) configured in the reference time window;

the wireless terminal camping on a cell; or a serving cell of the wireless terminal satisfying a cell reselection criterion.

5. The method of claim 1, wherein determining the eDRX cycle threshold comprises receiving a message from a wireless communication node in the wireless network and extracting the eDRX cycle threshold from the message, and wherein the message comprises at least one of a radio resource control (RRC) message or a system information message.

6. A computer program product comprising a non-transitory computer-readable program medium with computer code stored thereupon, the computer code, when executed by one or more processors, causing the one or more processors to implement a method of claim 1.

7. A wireless terminal comprising a memory for storing computer instructions and a processor in communication with the memory, wherein, when the processor executes the computer instructions, the processor is configured to cause the wireless terminal to:

determine an extended discontinuous reception (eDRX) cycle threshold associated with an access stratum function;

determine a reference time window;

determine whether the eDRX cycle of the wireless terminal is longer than the eDRX cycle threshold; and in response to the eDRX cycle being longer than the eDRX cycle threshold, configure or perform Access Stratum (AS) related functions of the wireless terminal via one of following manners:

manner 1) canceling or prohibiting the AS related functions; or manner 2) determining a PTW within the reference time window; and enabling a cell selection function at the beginning of the determined PTW.

8. The wireless terminal of claim 7, wherein:

the AS related functions comprise at least one of:

a cell search function;

a cell measurement function;

an evaluation of cell re-selection for a neighbor cell of the wireless terminal;

a cell re-selection procedure; or a cell selection procedure; and the AS related functions comprise functions of at least one of following categories:

an inter-frequency category; or an intra-frequency category.

* * * * *